July 25, 1950
G. W. EDWARDS
2,516,455
MEANS FOR PREPARING AND HOMOGENIZING
EMULSIONS, MIXTURES, AND THE LIKE
Filed Dec. 26, 1946
2 Sheets—Sheet 1
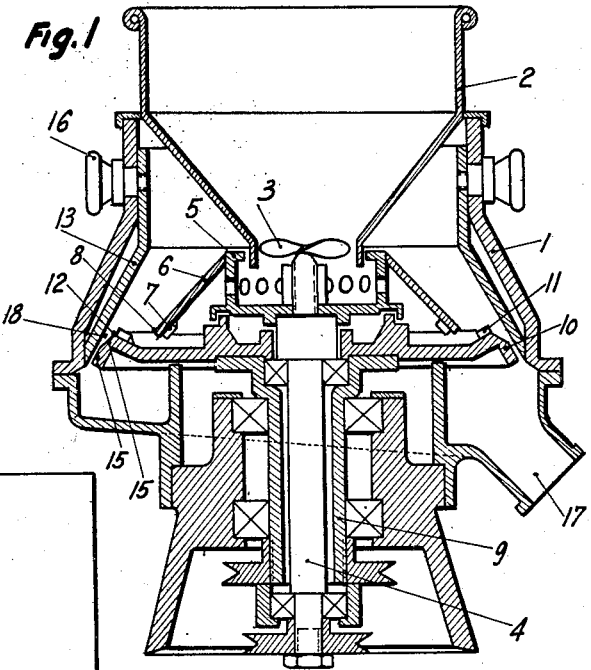
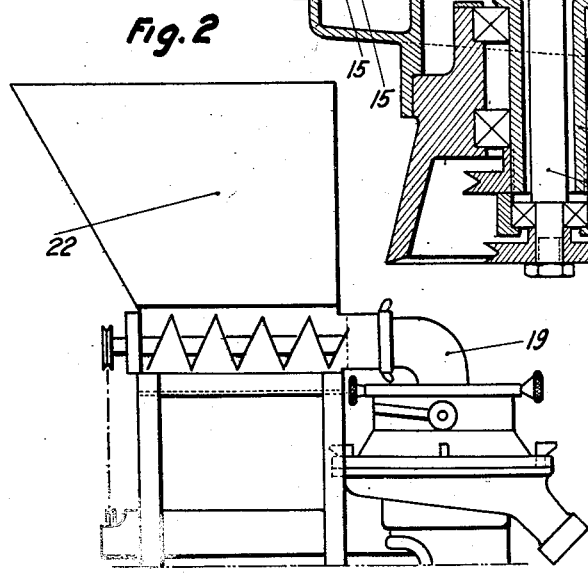
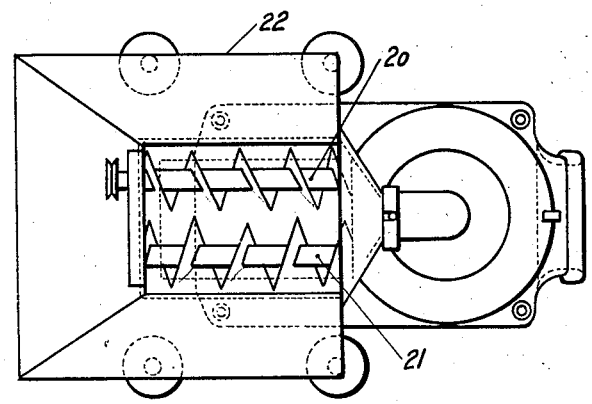
INVENTOR:
George W. EDWARDS
by Jewett and Jurad
Attorneys July 25, 1950　　　　　G. W. EDWARDS　　　　　2,516,455
MEANS FOR PREPARING AND HOMOGENIZING
EMULSIONS, MIXTURES, AND THE LIKE
Filed Dec. 26, 1946　　　　　　　　　　　　2 Sheets-Sheet 2
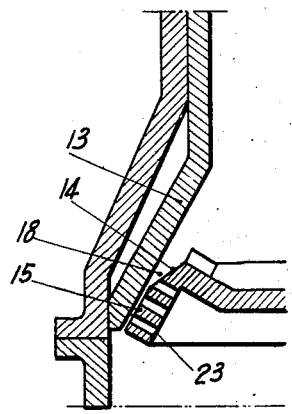
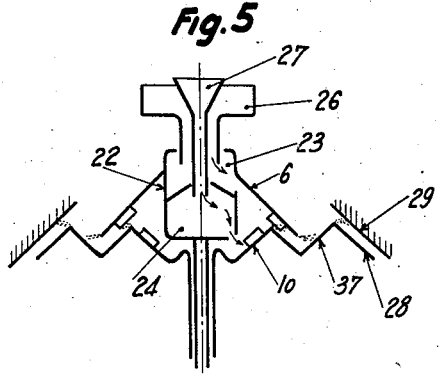
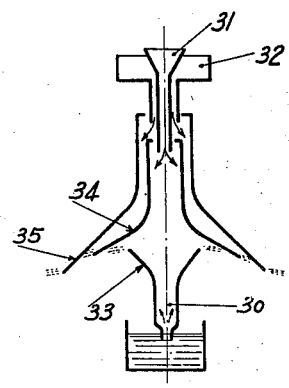
INVENTOR:
George W. EDWARDS
by Jewett and Jarad
Attorneys Patented July 25, 1950

2,516,455

UNITED STATES PATENT OFFICE 2,516,455

MEANS FOR PREPARING AND HOMOGENIZING EMULSIONS, MIXTURES, AND THE LIKE

George W. Edwards, Seine et Marne, France

Application December 26, 1946, Serial No. 718,552
In France December 27, 1945

3 Claims. (Cl. 259—96)

1

My invention has for its object improvements in means allowing the continuous obtention of mixtures, emulsions and the like or the homogenization to an extent as perfect as possible of already extant mixtures, emulsions or suspensions even in the case where the bodies formed by the mixture or mixtures to be homogenized have a more or less pasty consistency.

The arrangement according to my invention includes in the case of a mere homogenization of a mixture, a succession of rotary cones or the like surfaces of revolution arranged in coaxial relationship inside one another, whereby the mixture, chiefly if it is of more or less pasty consistency slides over the inner surface of one of the cones and it is projected at the output of the latter against the inner surface of the next cone which produces through drawing and impact phenomena the dispersion of the mixture and the breaking open of its granular elements under the form of grains of smaller size, said cones being associated with rolling means constituted for instance by a stationary preferably adjustable cone cooperating with a rotary cone coaxial with the former cones, the mixture to be treated being rolled between the stationary and rotary cone which leads to a reagglomeration of the grains and to the formation of a perfectly homogeneous mixture or smooth paste.

In the case where it is desired not only to render the mixture homogeneous but also to produce the mixture itself, the arrangement will include in addition to the preceding arrangements a special distributor for feeding one or more of the components of the mixture so as to constrain it to slide over one of the abovementioned cones while the other component or components of the mixture slide over another one whereby one of said components passes off the edge of the corresponding cone under the action of centrifugation and is projected under the form of a fine powder into the other components sliding over another cone under the form of an extremely thin layer also under the action of centrifugation. This arrangement may also be extended to the execution in stages of a mixture including more than two components. It allows through a suitable adjustment of the admission of these components into the cone to obtain mixtures having exactly the desired proportion of each component. The cones or the like surfaces of revolution may rotate according to my invention either all in a same direction or else in opposite directions, the rotation being performed at equal different speeds.

To ensure the guiding of the mixture and its regular flow through the apparatus in particular when it is pasty, it is possible to provide separately or in association according to my invention on one hand a rotary driving arrangement adapted to bring the paste into the first rotary cone and on the other hand blades or the like guiding means carried by the rotary cones.

In the case where the paste is particularly thick or dry difficulties may be encountered for ensuring a continuous feed of the apparatus. In this case it is possible in accordance with my invention to provide special feed means incorporating a worm for instance and ensuring a suitable feed.

As for the rolling arrangement moreover which includes as disclosed hereinabove a stationary cone cooperating with a rotary cone, I may provide preferably in accordance with my invention an arrangement whereby the distance between said conical surfaces is larger on the feed side than on the exhaust side in view of furthering the introduction of the mixture. This result may be obtained in particular by giving the rotary cone at least in its part of smaller diameter an apex angle greater than that of the stationary cone.

In the case where it is desired to obtain an aerated mixture this result may be obtained in a particularly simple manner by drilling in the rotary cone forming part of the rolling arrangement and located inside the stationary cone, small holes allowing the admission of air through a centrifugal action into the mixture as it is sliding between the two cones of the rolling arrangement.

Of course if it is desired no longer to aerate, but to make a gas other than air enter the mixture, the same result is obtained by providing a communication between the inside of the rotary cone and a capacity containing the gas considered.

Further objects and features of the invention will appear in the following description relating to accompanying drawings illustrating diagrammatically and by way of example various forms of execution of my invention. In said drawings:

Fig. 1 is a vertical cross-section of a homogenizing machine according to my invention.

Figs. 2 and 3 illustrate diagrammatically in plan and lateral view a feeding device adapted for use in particular in the case of the treatment of a particularly thick or dry paste.

Fig. 4 shows at a larger scale how the arrangement of Fig. 1 may be designed for allowing the aeration of the mixture to be treated.

Fig. 5 is a theoretical showing illustrating the easy transformation of the homogenizing machine into a homogenizing mixer for mixing two components.

Fig. 6 is a corresponding diagram showing how the same homogenizing machine may be transformed into a mixture for the separate mixing of more than two components.

In Fig. 1, 1 designates the frame of the machine and 2 a funnel carried by the said frame and serving for the introduction of the substance to be homogenized, which substance is supposed in the present example to be of a pasty character. Inside the funnel is located a helical driving and suction member 3 which serves for sucking inside the machine the material to be homogenized. This member 3 is carried directly by the central rotary shaft 4 of the machine.

Underneath the member 3 and rigid therewith is located one of the rotary members of the machine. This member includes a cylindrical portion 5 provided with perforations adapted to allow the passage of the paste which is thus subdivided and a cone 6 over the inner surface of which the mixture is caused to slide under the action of centrifugal force. This mixture is guided and carried along the cone by blades 7 until it reaches the edge of the cone at 8. This arrangement is carried directly by the shaft 4 which carries thus along with it as it rotates the elements 3, 5, 6. Round the shaft 4 is arranged a rotary sleeve 9 which rotates in a direction opposite to that of the shaft 4. These two rotary movements of the shaft 4 and of the sleeve 9 may be obtained in any suitable manner by means of a pulley drive for instance or otherwise. The sleeve 9 carries at its upper end a second cone 10 over the surface of which the material ejected out of the cone 6 over the edge 8 of the latter spreads out under the form of a thin layer carried along by the blades 11. When the material arrives at 12 at the edge of the cone, the material is projected forwards and impinges on the stationary wall 13 of the machine frame which assumes a conical shape as illustrated. This stationary conical part 13 cooperates with a double cone 14—15 including two superposed elements of different conicity and which rotates in unison with the cone 10. The two conical surfaces 13 and 15 which have the same angles at the apex of their cone are at a very small adjustable distance from one another; the adjustment is performed for instance, by displacing the part 13 with reference to the frame 1 and by securing it through a milled knob 16. Moreover the surface 14 which is rigid with the conical surface 15 has a cone apex angle which is slightly greater whereby the distance between the stationary surface 15 and the double cone 14—16 increases in an upward direction so that it is possible as disclosed hereinafter to provide for an easy introduction of the mixture between said surfaces.

A spout 17 allows collecting and removing the homogenized mixture. The arrangement which has just been described operates as follows:

The raw mixture is introduced into the funnel and is sucked in by the driving member 3 which introduces it inside the cylindrical part 5. Under the action of centrifugal force, said mixture is projected through the openings in said cylindrical part 5 into the cone 6. At the surface of said cone the mixture is carried along into a rotary movement through the blades 7 and it slides then over the cone 6 under the action of the centifugal force while assuming the shape of a thin layer; it leaves the cone at its edge 8 and it is projected under the action of centrifugation on to the second cone 10. There is produced at this moment an atomizing impact at the surface of the second cone which leads to a crushing and subdivision of the grains and also to a dispersion of the material. Once the material has arrived on the second cone 10, it is carried along by the blades 11 and slides over the second cone under the form of a thin layer and is then projected on to the conical part 13 on which it is again atomized and crushed.

These successive atomizations lead to a reduction in size of the grains which form the mixture, together with a homogeneous dispersion of the latter. When the mixture has arrived on the surface 13, the mixture continues being driven through the rotary surface 14—15 and it must then flow out under the action of this drive into the space 18 bounded by the stationary surface 13 on one hand and the rotary surfaces 14—15 on the other. The mixture is then submitted to a rolling operation which agglomerates and smooths it. The material which is thus rendered homogeneous and is agglomerated into a smooth mass is then removed through the exhaust spout.

The arrangement which has thus been described is applicable in all cases where it is desired to produce the homogenizing of a substance which is neither too thick nor too dry. In the case of a very thick or very dry substance, it may become difficult to obtain a regular feed of the apparatus. In this case it is of advantage to make use in conformity with my invention of feeding means such as the arrangement illustrated in Figs. 3 and 4, in this case the inside of the machine instead of being fed directly by the spout 2 is connected through a wide pipe 19 with a driving arrangement including a double worm 20—21 located at the bottom of a feed hopper 22.

These two worms which rotate preferably in opposite directions are advantageously driven in accordance with my invention through the same driving means as the shafts 4 and 9. They ensure a suitable flow of material into the pipe 19 and thence into the cone 6.

Fig. 4 illustrates modifications which may be brought to the arrangement for allowing an aeration of the material. It is sufficient in this case to provide in the walls of the cone 15 a plurality of small openings 23 which will act centrifugally when the double cone 14—15 rotates whereby the air is injected into the space 18 which ensures a sufficient aeration for the mixture.

As disclosed hereinabove, if it is desired to inject a gas different from air, it is sufficient to make the inside of the double cone 14—15 communicate with a capacity containing the gas considered.

In Fig. 5 which shows an arrangement similar to that shown in Fig. 1, I have illustrated means for mixing different components before homogenizing. The cylindrical part 5 is replaced by a distributor 22 illustrated very diagrammatically in the drawing. This distributor includes two chambers 23 and 24 adapted to receive each one of the components of the mixture and fed respectively through the funnels 26 and 27. One of the components fed through the funnel 26 flows out under the form of an extremely thin layer along the cone 6 as shown by the arrow. The other component introduced through the funnel 27 into the lower chamber 24 of the distributor flows over the lower cone 10 and when it arrives at the edge of said cone it is comminuted or atomized and projected into the thin layer advancing over the surface of the cone 6 whereby an extremely intimate mixture is obtained. This mixture may be immediately submitted to reagglomeration between surfaces similar to the surfaces 15 and 13 described in the case of Fig. 1. It is also possible as illustrated in Fig. 5 to project again against a conical surface 27' in order to submit it to shocks which ensure its further dispersion and homogenization after which the mixture leaves said surface and is reagglomerated between a surface 28 rotating with the lower cone and a stationary surface 29.

In the case it is desired to proceed with the mixing, no longer of two, but of three or more phases, it is possible to make use of a preliminary mixer of the type illustrated in Fig. 6 which comprises a distributor with three inlets 30, 31 and 32 for feeding respectively the corresponding components to the three rotary cones 33, 34 and 35. The component sliding over the cone 33 is projected in a finely atomized state against the fine layer of the component sliding over the cone 34 and the mixture thus obtained is projected in its turn in its finely atomized state against the fine layer of the component sliding over the surface of the cone 35.

Of course if more than three components are required, additional cones may be used. At the outlet from the last cone the mixture may, if required, be submitted to atomization and reagglomeration through means similar to those illustrated in Fig. 1.

Obviously many modifications may be brought to the apparatuses disclosed without unduly widening thereby the scope of the present invention. In particular, if required, it is possible to increase the number of cones from which the mixture is projected on to another cone. It is possible to give these cones different speeds of rotation and so on. As a matter of fact, in practice, the arrangement disclosed is sufficient for most applications.

The applications of the method are multiform: in all industrial fields the improved method and device described may be used for homogenizing any mixture whatever. In particular, the method and device considered may be used for smoothing curds and the like cheese containing material, fatty or not; it is sufficient in this case that the different parts of the apparatus in contact with the curds may be made of a material which is not liable to modify the flavor of the cheese, such as stainless steel.

What I claim is:

1. An apparatus for homogenizing a fluid pasty mixture comprising a first conical member, means for providing a rotation of said conical member round its axis, means for feeding the mixture to the inside thereof for flowing freely over the inner surface of said conical member and being projected centrifugally beyond the outer edge thereof, a rotary dished member coaxial with and located underneath the conical member and provided with a double frusto-conical flange along its outer edge beyond the location of the outer edge of the conical member, said flange forming a ridge raised above the dished member along the common larger base of its elementary frusto-cones, means for rotating said dished member round its axis and a stationary outer cone adapted to cooperate with the outside of the frusto conical flange for providing a lamination of the mixture projected by the first conical member on to the dished member and urged centrifugally over said frusto-conical flange, the spacing between the outer cone and the frusto-conical flange narrowing gradually from the inlet to the outlet provided for the mixture between same.

2. An apparatus for homogenizing a fluid pasty mixture comprising a first conical member, means for providing a rotation of said conical member round its axis, means for feeding the mixture to the inside thereof for flowing freely over the inner surface of said conical member and being projected centrifugally beyond the outer edge thereof, a rotary dished member coaxial with and located underneath the conical member and provided with a double-frusto-conical flange along its outer edge beyond the location of the outer edge of the conical member, said flange forming a ridge raised above the dished member along the common larger base of its elementary frusto-cones, the outer elementary frusto-cone of said flange having two frusto-conical surfaces, the first of which has a smaller base and a larger apex angle than the second outer frusto-conical surface, means for rotating said dished member round its axis and a stationary outer cone adapted to cooperate with the outer frusto-conical surface of the frusto-conical flange for providing a lamination of the mixture projected by the first conical member on to the dished member and urged contrifugally over said frusto-conical flange.

3. An apparatus for homogenizing a fluid pasty mixture comprising a first conical member, means for providing a rotation of said conical member round its axis, means for feeding the mixture to the inside thereof for flowing freely over the inner surface of said conical member and being projected centrifugally beyond the outer edge thereof, a rotary dished member coaxial with and located underneath the conical member and provided with a double frusto-conical flange along its outer edge beyond the location of the outer edge of the conical member, said flange forming a ridge raised above the dished member along the common larger base of its elementary frusto-cones, means for rotating said dished member round its axis and a stationary outer cone adapted to cooperate with the outside of the frusto-conical flange for providing a lamination of the mixture projected by the first conical member on to the dished member and urged centrifugally over said frusto-conical flange, and means for feeding an aeriform fluid through the outer portion of the flange into the gap separating same from the stationary cone.

GEORGE W. EDWARDS.

REFERENCES CITED

The following references are of record in the file of this patent:

UNITED STATES PATENTS

| Number | Name | Date |
| --- | --- | --- |
| 525,095 | Detwiler | Aug. 28, 1894 |
| 1,163,066 | Carpenter | Dec. 7, 1915 |
| 1,992,447 | Savy | Feb. 26, 1935 |
| 2,007,218 | Seltzer | July 9, 1935 |
| 2,186,033 | Milton | Jan. 9, 1940 |
| 2,245,112 | McLean | June 10, 1941 |
| 2,273,835 | Cornell | Feb. 24, 1942 |

FOREIGN PATENTS

| Number | Country | Date |
| --- | --- | --- |
| 461,772 | Great Britain | Feb. 24, 1937 |